(12) United States Patent
Houck et al.

(10) Patent No.: US 8,724,429 B2
(45) Date of Patent: May 13, 2014

(54) SYSTEM AND METHOD FOR PERFORMING TIME-LAPSE MONITOR SURVERYING USING SPARSE MONITOR DATA

(75) Inventors: Richard T. Houck, Houston, TX (US); Grant A. Gist, Houston, TX (US); Dachang Li, Katy, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 416 days.

(21) Appl. No.: 13/127,133

(22) PCT Filed: Dec. 4, 2009

(86) PCT No.: PCT/US2009/066704
§ 371 (c)(1),
(2), (4) Date: May 2, 2011

(87) PCT Pub. No.: WO2010/077568
PCT Pub. Date: Jul. 8, 2010

(65) Prior Publication Data
US 2012/0014217 A1      Jan. 19, 2012

Related U.S. Application Data

(60) Provisional application No. 61/138,447, filed on Dec. 17, 2008.

(51) Int. Cl.
*G01V 1/00*      (2006.01)
*G01V 1/28*      (2006.01)

(52) U.S. Cl.
CPC .......... *G01V 1/282* (2013.01); *G01V 2210/612* (2013.01)
USPC .......................................................... 367/73

(58) Field of Classification Search
USPC .......................................................... 367/73
See application file for complete search history.

(56) References Cited

U.S. PATENT DOCUMENTS 3,921,126 A    11/1975   Waters
4,784,189 A    11/1988   Hellström
(Continued)

FOREIGN PATENT DOCUMENTS

CA     2 542 416     5/2005
GB     2 372 567     8/2002
(Continued)

OTHER PUBLICATIONS

Sarka, S. et al. (2003), "On the inversion of time-lapse seismic data," *SEG Expanded Abstracts* 22, 4 pgs.

(Continued)

*Primary Examiner* — Krystine Breier
(74) *Attorney, Agent, or Firm* — ExxonMobil Upstream Research Company Law Dept.

(57) ABSTRACT

Techniques are disclosed for performing time-lapse monitor surveys with sparsely sampled monitor data sets. An accurate 3D representation (e.g., image) of a target area (e.g., a hydrocarbon bearing subsurface reservoir) is constructed (12) using the sparsely sampled monitor data set (11). The sparsely sampled monitor data set may be so limited that it alone is insufficient to generate an accurate 3D representation of the target area, but accuracy is enabled through use of certain external information (14). The external information may be one or more alternative predicted models (25) that are representative of different predictions regarding how the target area may change over a lapse of time. The alternative models may, for example, reflect differences in permeability of at least a portion of the target area. The sparsely sampled monitor data set may then be processed to determine (23) which of the alternative models is representative of the target area.

15 Claims, 6 Drawing Sheets

(56) References Cited

U.S. PATENT DOCUMENTS

| | | | |
|---|---|---|---|
| 4,884,248 A | 11/1989 | Laster et al. | |
| 4,969,130 A | 11/1990 | Wason et al. | |
| 4,992,996 A | 2/1991 | Wang | |
| 5,018,112 A | 5/1991 | Pinkerton et al. | |
| 5,148,406 A | 9/1992 | Brink et al. | |
| 5,548,563 A * | 8/1996 | Slevinsky | 367/25 |
| 5,586,082 A | 12/1996 | Anderson et al. | |
| 5,629,904 A | 5/1997 | Kosloff et al. | |
| 5,638,269 A | 6/1997 | Fournier et al. | |
| 5,796,678 A | 8/1998 | Pisetski | |
| 5,798,982 A | 8/1998 | He et al. | |
| 5,831,935 A | 11/1998 | Luo et al. | |
| 5,870,690 A | 2/1999 | Frenkel et al. | |
| 5,873,051 A | 2/1999 | Van Bemmel et al. | |
| 5,878,372 A | 3/1999 | Tabarovsky et al. | |
| 5,905,657 A | 5/1999 | Celniker | |
| 5,986,974 A | 11/1999 | Luo et al. | |
| 6,028,820 A | 2/2000 | Pisetski | |
| 6,041,018 A | 3/2000 | Roche | |
| 6,057,561 A | 5/2000 | Kawasaki et al. | |
| 6,070,125 A | 5/2000 | Murphy et al. | |
| 6,125,330 A | 9/2000 | Robertson et al. | |
| 6,266,619 B1 | 7/2001 | Thomas et al. | |
| 6,317,384 B1 | 11/2001 | Luo et al. | |
| 6,356,844 B2 | 3/2002 | Thomas et al. | |
| 6,374,201 B1 | 4/2002 | Grizon et al. | |
| 6,389,361 B1 | 5/2002 | Geiser | |
| 6,438,069 B1 | 8/2002 | Ross et al. | |
| 6,498,989 B1 | 12/2002 | Pisetski et al. | |
| 6,529,833 B2 | 3/2003 | Fanini et al. | |
| 6,553,315 B2 | 4/2003 | Kerekes et al. | |
| 6,560,540 B2 | 5/2003 | West et al. | |
| 6,574,563 B1 | 6/2003 | Nickel | |
| 6,614,717 B1 | 9/2003 | Khan et al. | |
| 6,691,075 B1 | 2/2004 | Winbow et al. | |
| 6,694,263 B2 | 2/2004 | Fournier et al. | |
| 6,715,551 B2 | 4/2004 | Curtis et al. | |
| 6,763,304 B2 | 7/2004 | Schonewille | |
| 6,763,305 B2 | 7/2004 | Bernitsas | |
| 6,778,918 B2 | 8/2004 | Delhomme et al. | |
| 6,801,858 B2 | 10/2004 | Nivlet et al. | |
| 6,826,483 B1 | 11/2004 | Anderson et al. | |
| 6,829,538 B2 | 12/2004 | De Kok | |
| 6,853,921 B2 | 2/2005 | Thomas et al. | |
| 6,876,928 B2 | 4/2005 | Van Riel et al. | |
| 6,889,142 B2 | 5/2005 | Schonewille | |
| 6,904,368 B2 | 6/2005 | Reshef et al. | |
| 6,906,982 B2 | 6/2005 | Calvert | |
| 6,912,466 B1 | 6/2005 | Gao | |
| 6,980,940 B1 | 12/2005 | Gurpinear et al. | |
| 6,985,404 B2 | 1/2006 | Mallick | |
| 6,989,841 B2 | 1/2006 | Docherty | |
| 7,027,354 B2 | 4/2006 | Cole et al. | |
| 7,027,929 B2 | 4/2006 | Wang | |
| 7,079,952 B2 | 7/2006 | Thomas et al. | |
| 7,162,463 B1 | 1/2007 | Wentland et al. | |
| 7,167,414 B2 | 1/2007 | Lee et al. | |
| 7,242,637 B2 | 7/2007 | Van Den Bekel et al. | |
| 7,254,999 B2 | 8/2007 | Bostick, III | |
| 7,298,671 B2 | 11/2007 | Brinkmann et al. | |
| 7,333,392 B2 | 2/2008 | Burnstad | |
| 7,355,923 B2 | 4/2008 | Reshef et al. | |
| 7,376,539 B2 | 5/2008 | Lecomte | |
| 7,456,113 B2 | 11/2008 | Rayandayan et al. | |
| 7,478,024 B2 | 1/2009 | Gurpinar et al. | |
| 7,523,003 B2 | 4/2009 | Robertsson et al. | |
| 7,577,061 B2 | 8/2009 | Williamson et al. | |
| 7,620,534 B2 * | 11/2009 | Pita et al. | 703/10 |
| 7,660,711 B2 | 2/2010 | Pita et al. | |
| 7,739,089 B2 | 6/2010 | Gurpinar et al. | |
| 7,752,022 B2 | 7/2010 | Fornel et al. | |
| 7,797,996 B2 | 9/2010 | Bostick, III | |
| 7,859,943 B2 | 12/2010 | Herwanger | |
| 7,953,585 B2 | 5/2011 | Gurpinar et al. | |
| 8,086,426 B2 | 12/2011 | El Ouair et al. | |
| 2006/0153005 A1 | 7/2006 | Herwanger et al. | |
| 2006/0285435 A1 | 12/2006 | Robertsson | |
| 2008/0004847 A1 | 1/2008 | Bradford | |
| 2008/0170468 A1 | 7/2008 | Brain et al. | |

FOREIGN PATENT DOCUMENTS

| | | |
|---|---|---|
| WO | WO 99/67660 | 12/1999 |
| WO | WO 00/19240 | 4/2000 |
| WO | WO 2004/090575 | 10/2004 |
| WO | WO 2005/066660 | 7/2005 |
| WO | WO 2009/011735 | 1/2009 |
| WO | WO 2009/051899 | 4/2009 |
| WO | WO 2009/027420 | 5/2009 |
| WO | WO 2010/075568 | 7/2010 |
| WO | WO 2010/077569 | 7/2010 |

OTHER PUBLICATIONS

Barkved, O.I. et al. (2005), "Valhall Permanent Seismic Monitoring—Reducing Geological Model Uncertainties Using 4-D Seismic," *EAGE Expanded Abstract*.

Beyreuther, M. et al. (2005), "Computation of time-lapse differences with 3D directional frames," XP002550568, SEG/Houston Annual Meeting, pp. 2488-2492.

Candes, E. et al. (2006), "Fast Discrete Curvelet Transforms," *Mutiscale Model. Simul.* 5(3), pp. 861-899.

Ceragioli, E. et al. (2006), "Filling the Gap—Integrating Nodes and Streamer Data for Geophysical Monitoring Purposes," *EAGE Expanded Abstract*, 5 pgs.

Curtis, (2004), "Theory of Model-based Geophysical Survey and Experimental Design," *The Leading Edge* 23, pp. 997-1004.

Foster, D.G. (2006), "Lessons Learnt from over 20 years of 4-D Deployment," SPE 11352, 2008 Indian Oil & Gas Tech. Conf. & Exh., 11 pgs.

Hermann, F.J. et al. (2008), "Curvelet-based seismic data processing: A multiscale and nonlinear approach," *Geophysics* 73(1), pp. A1-A5.

Huang, X. et al. (1997), "Reservoir Characterization by Integration of Time-Lapse Seismic and Production Data," SPE 38695, 1997 SPE Annual Tech. Conf. & Exh., pp. 439-447.

Kaldy, W.J. et al. (2006), "Short Cable 4D Investigation—Case History from the Amberjack field in the Gulf of Mexico," SEG/New Orleans Annual Meeting, pp. 3170-3174.

Landrø, M. et al. (2004), "Time lapse refraction seismic—a toll for monitoring carbonate fields?" *SEG Expanded Abstract*.

Lüth, S. et al. (2005), "Fresnel volume migration of multicomponent data," Geophysics 70(6), pp. S121-S129.

Landrø, M. et al. (2005), "Pressure depletion measured by time-lapse VSP," *The Leading Edge*, pp. 1226-1232.

Sahni, I. et al. (2005), "Multiresolution Wavelet Analaysis for Improved Reservoir Description," XP-002550569, 2005 SPE Reservoir & Evaluation & Engineering, pp. 53-69.

Smit, F. et al. (2006), "Toward affordable permanent seismic reservoir monitoring using the sparse OBC concept," *The Leading Edge*, pp. 454-459.

Staples, R. et al. (2006), "Time-Lapse (4D) Seismic Monitoring—Expanding Applications," 2006 CSPG,—CSEG, CWLS Convention, pp. 181-189.

*European Search Report*, dated Oct. 28, 2009, EP 09 15 8926.

International Search Report and Written Opinion, dated Feb. 5, 2010, PCT/US2009/066704.

* cited by examiner

SYSTEM AND METHOD FOR PERFORMING TIME-LAPSE MONITOR SURVERYING USING SPARSE MONITOR DATA

CROSS-REFERENCE TO RELATED APPLICATIONS

This application is the National Stage of International Application No. PCT/US2009/066704, that published as WO 2010/077568, filed 4 Dec. 2009, which claims the benefit of U.S. Provisional Application No. 61/138,447, filed 17 Dec. 2008, each of which is incorporated herein by reference, in its entirety, for all purposes.

TECHNICAL FIELD

The following description relates generally to acquisition and processing of geophysical data (e.g., seismic data, electromagnetic data) for generating a 3D representation (e.g., image) of a target subsurface area, such as a target hydrocarbon bearing subsurface reservoir, and more particularly to techniques for performing time-lapse surveying using sparsely acquired geophysical data.

BACKGROUND

In geological exploration, it is desirable to obtain information regarding the various formations and structures that exist beneath the Earth's surface. Such information may include determining geological strata, density, porosity, composition, etc. This information may then be used to generate a representation of the subsurface basin using the obtained data to predict the location of hydrocarbon reserves and aid in the extraction of hydrocarbon.

Seismic data acquisition and processing is one approach that is typically used to generate a representation of the subsurface basin. Indeed, a general goal of seismic processing is to image subsurface reflectors. In a general application, during a seismic survey, seismic energy is generated by a source and travels vertically as body waves into subsurface regions to reflectors, and then returns to receivers (e.g., geophones). The reflected energy received may then be processed to determine a representation of the subsurface region (e.g., via imaging) to, for example, analyze the location of hydrocarbon reserves.

Three-dimensional (3D) seismic survey techniques are well-known in the art. In general, seismic monitor data (e.g., the above-mentioned reflected energy collected by a receiver, such as a geophone) is acquired for a target area (or "field") that is of interest, and such seismic monitor data is processed to form a representation of the subsurface region that is the target area. The representation of the subsurface may take any of various different forms, including an image of the subsurface at various depths. Such representation of the subsurface may identify the geological formations (e.g., location, shape, etc. of different geological materials/objects), including hydrocarbon bearing underground reservoirs of fluids (e.g., oil, gas, water). Conventional 3D seismic surveys include three dimensions relating to the spatial characteristics of the earth formation. Generally, two dimensions correspond to horizontal length dimensions, and the third dimension relates to depth in the Earth formation, which can be represented by a length coordinate (or by a time coordinate, such as the two-way travel time of a seismic wave from surface to a certain depth and back).

Seismic surveying techniques generally investigate the subsurface formation by generating seismic waves that travel through the subsurface formation, and measuring the time the waves need to travel between one or more seismic sources and one or more seismic receivers. The travel time of a seismic wave is dependent on the length of the path traversed, and the velocity of the wave along the path. 3D seismic surveying is commonly employed when analyzing a target field for potential drilling to extract fluids (e.g., for determining whether and/or where in the target field to drill). As discussed further herein, such 3D seismic surveying has traditionally been computationally intensive, expensive, and have involved significant time to produce.

Time-lapse seismic surveying is increasingly used for studying of subsurface formations. It is applied for monitoring of hydrocarbon bearing underground reservoirs, in particular to follow the effects resulting from producing (i.e., "extracting") reservoir fluids (e.g., oil, gas, water) through a well to surface.

In time-lapse seismic surveying, seismic data are acquired at at least two points in time. Time is therefore an additional parameter with regard to conventional seismic surveying. This allows studying the changes in seismic properties of the subsurface as a function of time due to, for example, spatial and temporal variation in fluid saturation, pressure, temperature, and/or other seismic properties. Conventionally, such time-lapse seismic surveying involves performing the above-mentioned 3D surveying at different points in time. Thus, time-lapse seismic surveying is also referred to as 4-dimensional (4D) seismic surveying, wherein time between seismic data acquisitions represents a fourth data dimension. As in the above-mentioned 3D surveying, the three other dimensions relate to the spatial characteristics of the earth formation. The time span between the first and the second points in time at which seismic data are acquired may be several years. Conventionally, one acquires the first and second seismic data sets in a similar manner, so that the data sets are easier to compare.

Time-lapse (or "4D") seismic surveying has become a common tool for monitoring changes in producing hydrocarbon reservoirs. The information about changes in reservoir fluid distribution and pore pressure provided by time-lapse surveys is useful in making decisions in reservoir management. Decisions affected by time-lapse seismic surveying include placement of infill wells and control of production and injection rates to maximize oil recovery efficiency, as examples.

The typical implementation of time-lapse seismic involves collecting a sequence of 3D seismic surveys over a producing reservoir, and using the representations (e.g., images) generated from the recorded seismic data to infer changes in reservoir conditions over time. For economic reasons, some time-lapse surveys have been collected using conventional marine streamer acquisition, where a boat sails a grid of lines over the reservoir, continuously activating seismic sources and recording data using receivers in long streamers towed behind the boat. However, the method has also been implemented using receivers placed on the sea floor, in bore-holes, and, for onshore fields, using conventional 3D land acquisition methods.

The first survey in the time-lapse sequence, commonly called the "base survey," is ideally acquired before production starts. The processed image generated from the base survey measures the initial seismic response of the reservoir. One or more later surveys, called "monitor surveys," are acquired at time intervals that depend on the expected dynamic properties (e.g., fluid distribution and pressure) of the reservoir; e.g., one to three year intervals are typical.

The reservoir image generated from a monitor survey is different from the base survey image. Some of this difference is due to changes in dynamic reservoir properties; and some is due to a variety of other factors not related to reservoir changes. Differences between base and monitor images that are not associated with reservoir changes, commonly called "non-repeatability", can mask the differences that indicate reservoir changes. Minimizing non-repeatability is an important objective of time-lapse acquisition and processing.

Acquiring and processing a full 3D monitor survey is time-consuming and expensive. The time required to acquire, process and interpret a given survey can exceed one year, and the cost associated with acquiring and processing a full 3D seismic survey may be upwards of twenty million U.S. dollars. The delay in time required for a full 3D seismic survey can result in missed opportunities for affecting reservoir management decisions. And, the cost of the seismic survey may exceed the benefits of the information that results from the seismic survey. Consequently, reducing the time and the cost of time-lapse seismic surveys has been a longtime industry goal.

One approach that has been proposed for reducing the time and cost of time-lapse surveys is to permanently install an array of seismic receivers over the reservoir. See e.g., Barkved, O. I., K. Buer, and T. G. Kristiansen, 2005, *Valhall Permanent Seismic Monitoring—Reducing Geological Model Uncertainties Using 4-D Seismic*, EAGE 2005 Expanded Abstract. Once the receivers are in place, repeated seismic surveys can be acquired at relatively low cost by firing appropriate seismic sources over the receivers. However, although the cost of a repeat survey is lowered in this instance, the initial cost of installing the receiver array in the first place is undesirably high. Full permanent installations are generally economically advantageous when the field is small and shallow (so it can be covered without having to use a large number of receivers), and when the field has a long production life (so the cost of the installation can be spread over many monitor surveys). Because they are appropriate under a limited set of conditions, full permanent installations are rarely used.

A second approach is to record less seismic data in monitor surveys, thereby attempting to reduce cost and/or time involved with performing the monitor surveys. This approach has been tested with permanent (see Smit, F., M. Ligtendag, P. Wills, and R. Calvert, 2006, *Toward Affordable Permanent Seismic Reservoir Monitoring Using the Sparse OBC Concept*, The Leading Edge) and redeployable (see Ceragioli, E., A. Kabbej, A. Gonzalez Carballo, and D. Martin, 2006, *Filling the Gap—Integrating Nodes and Streamer Data for Geophysical Monitoring Purposes*, EAGE 2006 Expanded Abstract) sea-bottom receivers, and with short marine streamers (see Kaldy, W. J., K. Hartman, P. Sen, C. Barousse, D. Stauber, and E. Xu, 2006, *Short Cable 4D Investigation—Case History from the Amberjack Field in the Gulf of Mexico*, SEG 2006 Expanded Abstract). These tests indicate that 3D seismic images generated from a limited seismic data set were contaminated with levels of non-repeatable noise and imaging artifacts that were too high for most time-lapse applications.

One way to avoid artifacts that arise from conventional 3D imaging is by not performing 3D imaging. Time-lapse 2D imaging, as reported by Staples, R, J. Stammeijer, S. Jones, J. Brain, F. Smit, and P. Hatchell, 2006, *Time-Lapse (4D) Seismic Monitoring—Expanding Applications*, CSEG Expanded Abstract, is faster and cheaper than 3D, and a 2D image does not contain the same kind of artifacts as a reduced-data 3D image. However, 2D imaging has its own shortcomings that make it inappropriate for time-lapse surveys, except in special cases. For instance, such 2D imaging assumes that the subsurface variations take place in the direction of the 2D line. This assumption is generally not satisfied in the actual subsurface area being targeted, so a 2D image is a distorted version of the targeted subsurface.

Other methods that do not use 3D imaging are time-lapse refraction (see Landrø, M., A. K. Nguyen, and H. Mehdizadeh, 2004, *Time-Lapse Refraction Seismic—A Tool for Monitoring Carbonate Fields*, SEG 2004 Expanded Abstract), and time-lapse vertical seismic profile (VSP) (see Landrø, M., P. Digranes, and L. K. Strønen, 2006, *Pressure Depletion Measured by Time-Lapse VSP*, The Leading Edge, 24, 1226), but these are also useful only under special circumstances.

SUMMARY

In view of the above, a desire exists in the art for a technique for performing time-lapse monitor surveys in a more time-efficient and economical manner. For instance, a desire exists for a technique for performing time-lapse monitor surveys by acquiring less geophysical data (e.g., seismic, electromagnetic, electroseismic). However, it is also desirable for a technique that can use such a sparsely sampled monitor data set for generating an accurate 3D representation (e.g., 3D seismic image) of the target area (e.g., subsurface hydrocarbon reservoir) being analyzed, wherein the generated 3D representation is not contaminated with unacceptably-high levels of non-repeatable noise and imaging artifacts.

Ideally, one would like to use a sparsely sampled monitor data set, which could be obtained and processed quickly and at low cost, to obtain information about dynamic reservoir changes, where the information has quality similar to the information derived from fully sampled 3D surveys. As mentioned above, prior efforts at accomplishing this have demonstrated that eliminating part of the geophysical data (e.g., seismic) that is conventionally acquired may also eliminate some of the information about reservoir changes because it results in a 3D representation that is contaminated with high levels of non-repeatable noise and/or imaging artifacts.

The present invention is thus directed generally to systems and methods for performing time-lapse monitor surveys with sparsely sampled monitor data sets. For instance, systems and methods are disclosed for performing a time-lapsed monitor survey that enables an accurate 3D representation (e.g., image) of a target area (e.g., reservoir) to be constructed using a sparsely sampled seismic data set that is acquired for the monitor survey. As used herein, "accurate" means a result that closely resembles (e.g., within a specified threshold or error range) the actual earth model. In embodiments of the present invention, the obtained sparsely sampled monitor data set is so limited such that it alone is insufficient to generate an accurate 3D representation of the target area. That is, the sparsely sampled data set alone is insufficient to, through use of known 3D imaging techniques (e.g., migration or other suitable technique), produce a 3D representation having a desired resolution for confident analysis of the target area. However, accuracy of the 3D representation is enabled through supplemental use of certain external information in addition to the acquired sparsely sampled monitor data set for generation of the 3D representation. That is, the sparsely sampled monitor data set that is acquired for a time-lapsed monitor survey may be processed with other external information, such as certain information that is predetermined (e.g., in an earlier base survey) and/or certain information that is predicted or derived (e.g., from an earlier base survey or modeling), to generate an accurate 3D representation of the target area at the point in time of acquisition of the sparsely sampled monitor data set.

In general, in the context of the present application, a sparsely sampled monitor data set refers to a geophysical data set (e.g., seismic data set, electromagnetic data set) that is received from a configuration of sources and receivers where conventional imaging (e.g., migration) is inapplicable, or where conventional migration produces an image that is inadequate for time-lapse analysis. As one example of acquisition of sparsely sampled monitor data for seismic data, an arrangement of source and receiver locations such as that disclosed in the example of FIG. 4 of the aforesaid PCT International Application based on U.S. Provisional Patent Application Ser. No. 61/138,446 titled "Method for Imaging of Targeted Reflectors" may be employed, which has enough sources and receivers to cover the entire target area, but the sources and receivers are arranged such that the migrated image they produce is contaminated with artifacts. The sparsely sampled monitor data set may, in some instances, be data sets that are so limited that conventional migration or imaging does not produce an image that represents the real subsurface with sufficient accuracy for time-lapse analysis. However, as disclosed further herein, such sparsely sampled monitor data sets may be used with external data for accurate analysis of the target area.

According to one embodiment, a base survey is initially conducted for a target area, wherein the base survey may be performed in a conventional manner in which fully sampled 3D data sets (e.g., seismic) are acquired for processing to generate an accurate 3D representation of the target area (e.g. subsurface region) as it exists at the point in time at which the fully sampled 3D data sets are acquired. At some point in time later, a time-lapsed monitor survey is performed, wherein a sparsely sampled monitor data set is acquired for the target area. Time and/or cost associated with conducting the later time-lapsed monitor survey may be greatly reduced from that associated with the base survey because less data is acquired. As one example of acquisition of sparsely sampled monitor data for seismic, an arrangement of source and receiver locations such as that disclosed in the example of FIG. 4 of the aforesaid PCT International Application based on U.S. Provisional Patent Application Ser. No. 61/138,446 titled "Method for Imaging of Targeted Reflectors" may be employed. This exemplary sparsely sampled survey records about a factor of forty less seismic data than is typically used to image the same area with conventional 3D imaging techniques using a traditional fully sampled seismic data acquisition.

In embodiments of the present invention, the sparsely sampled monitor data set that is acquired for the later time-lapsed monitor survey is so limited that it alone is insufficient to generate an accurate 3D representation of the target area. A conventional fully sampled 3D survey records many "extra" traces to meet the requirements of 3D imaging. Failing to meet these requirements traditionally produces imaging artifacts that are particularly problematic for time-lapse interpretation. Embodiments of the present invention enable sparse sampling of monitor data to be acquired for use in generating a 3D representation of the target area. For instance, in certain embodiments, such as discussed further in the aforesaid PCT International Application based on U.S. Provisional Patent Application Ser. No. 61/138,446 titled "Method for Imaging of Targeted Reflectors", targeted imaging is performed, which may, depending on the size and depth of the target, enable the sparsely sampled monitor data set acquisition to be reduced by a factor of twenty to fifty fewer traces than are traditionally utilized for fully sampled data sets employed in conventional 3D imaging techniques. Other embodiments, such as those discussed further herein and those discussed further in the aforesaid PCT International Application based on U.S. Provisional Patent Application Ser. No. 61/138,451 titled "System and Method for Reconstruction of Time-Lapse Data," may enable even fewer traces to be acquired in the sparsely sampled monitor data set, depending on details of the target. Of course, there is a tradeoff involved, as the "extra" traces may be useful for reducing the effect of recorded noise. Thus, for noisy target areas, more data traces may be desirable.

The sparsely sampled monitor data set that is acquired for the time-lapsed monitor survey is then processed with other external information, such as certain information that was predetermined (e.g., in an earlier base survey) and/or certain information that is predicted or derived (e.g., from an earlier base survey), to generate an accurate 3D representation of the target area at the later point in time at which the sparsely sampled monitor data set is acquired.

Certain embodiments of this invention use one or more sparsely sampled monitor data sets to monitor subsurface hydrocarbon reservoir changes by using external information, either from seismic or non-seismic sources, to replace some of the information lost by reducing the amount of recorded data. The external information that is used may differ according to different embodiments.

In one embodiment, such as discussed further herein, the external information may be a plurality of alternative predicted models of the target area. The models may be representative of different predictions regarding how the target area may change over a lapse of time. For instance, an accurate representation of the target area may be initially determined (e.g., prior to determining to drill the target area) by conducting a full 3D survey (i.e., a "base survey"), and the alternative models may represent potential changes that may occur in the accurately-represented target area over a lapse of time. The alternative models may, for example, reflect differences in permeability of at least a portion of the target area. Thus, the models may reflect how the initially-determined 3D representation of the target area (as determined in the base survey) may change over the time lapse based on whether a permeability barrier, low permeability, or high permeability is encountered in the target area. The acquired sparsely sampled monitor data set may then be processed to determine which of the plurality of alternative models is representative of the target area. Thus, instead of trying to perform a full interpretation of the sparsely sampled monitor data set, in certain embodiments; such sparsely sampled monitor data set is used to determine which of the plurality of alternative models is representative of the target area as it exists at the time of acquisition of the sparsely sampled monitor data set.

In certain embodiments, as discussed further in the aforesaid patent application titled "System and Method for Reconstruction of Time-Lapse Data," the disclosure of which is incorporated herein by reference, the external information may comprise a base survey which is transformed in a manner consistent with the sparsely sampled monitor data set acquired in a later monitor survey to result in derivation of full 3D data that can be processed in a traditional manner for computing an accurate 3D representation (e.g., 3D image) of the target area under analysis.

In certain embodiments, as discussed further in the aforesaid patent application titled "Method for Imaging of Targeted Reflectors," the disclosure of which is incorporated herein by reference, the external information may comprise information accurately identifying a shape of the reflector(s) present in the target area. For instance, as mentioned above, an accurate representation of the target area may be initially determined (e.g., prior to determining to drill the target area)

by conducting a fully sampled 3D survey (i.e., a "base survey"). From the base survey, an accurate shape of the reflectors is determined. In a later, time-lapsed monitor survey, a sparsely sampled monitor data set is acquired or obtained, and sufficient data/processing does not have to be performed to determine the shape of the reflector(s). Instead, the predetermined shape (known from the base survey) is used to more accurately compute, from the sparsely sampled monitor data set that is acquired, the amplitude data from the reflectors of the target area at the later time.

Thus, according to certain embodiments, external information is utilized in designing the acquisition and/or processing of the monitor data set, thereby enabling a sparsely sampled monitor data set to be acquired for the monitor survey while also enabling generation of an accurate 3D representation of the target area that is based on the sparsely sampled monitor data set.

Of course, seismic surveys may use some types of external information in acquisition design and processing. Certain embodiments of the present invention differ from conventional 3D imaging processes in that the external information functions not as a supplementary aid, but as a necessary input for overcoming the deficiencies of 3D imaging based on the sparse data only, or for circumventing 3D imaging altogether. Indeed, in certain embodiments, the sparse data obtained for the target area is utilized with the external information to provide a 3D representation for the target area that is not based on the 3D imaging. Most conventional time-lapse approaches try to generate a monitor image entirely from the acquired/recorded seismic data. External information may be used in conventional techniques in, for example, building a velocity model, but the 3D image of the target area is constructed using only the acquired/recorded seismic data. Embodiments of the present invention further employ appropriate external information to construct an accurate 3D image for the target area as it exists at the time that the sparsely sampled seismic monitor data set is acquired.

Conventional imaging methods normally used to process time-lapsed seismic data in a monitor survey make no assumptions about the target area (e.g., reservoir) that is being analyzed. Consequently, in conventional imaging methods the acquired seismic data typically supplies the information needed to construct a 3D reservoir image. The incomplete information provided by a sparsely sampled monitor data set, alone, are inadequate for constructing complete images that are sufficiently repeatable for time-lapse analysis. As discussed further with certain embodiments of the present invention, certain external information that restricts the possible reservoir states can compensate for the incompleteness of the sparsely sampled monitor data set.

According to certain embodiments of the present invention, the external information utilized is selected to sufficiently constrain the reservoir to enable the sparsely sampled monitor data set that is acquired to disambiguate the condition/state of the reservoir. Examples of external information that can function this way include:
1. a set of specific reservoir model scenarios that have different interpretations and fluid flow properties, such as described further herein;
2. a fully sampled and interpreted 3D base survey, such as described further in the aforesaid patent application titled "System and Method for Reconstruction of Time-Lapse Data," the disclosure of which is incorporated herein by reference; and
3. a structure map of a particular reservoir reflector, such as described further in the aforesaid patent application titled "Method for Imaging of Targeted Reflectors," the disclosure of which is incorporated herein by reference.

In certain embodiments, some interpretation takes place before acquisition and processing of the sparsely sampled monitor data set for a monitor survey, and the results of the interpretation are part of the structure of the acquisition and processing of the sparsely sampled monitor data set.

The foregoing has outlined rather broadly the features and technical advantages of the present invention that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION

As mentioned above, traditional time-lapse monitor surveys have been fully sampled 3D surveys with a density of source and receiver locations similar to that of the initial base survey. Even under good conditions, this can be costly, and in some cases, producing infrastructure may make it operationally unfeasible/impractical to acquire a fully sampled monitor data set from a monitor survey. A sparsely sampled monitor data set, however, can result in an uninterpretable time-lapse survey because reservoir changes are typically obscured by non-repeatable artifacts and noise. As discussed further below, certain embodiments of the present invention disclose a technique that, instead of trying to perform a full interpretation of the time-lapse sparsely sampled monitor data set, uses the acquired sparsely sampled monitor data set to test a previously identified set of scenarios (or "models") for the possible changes occurring in the reservoir. This process may be used to collect sparse data for seismic data sets, electromagnetic data sets, gravity data sets, magnetic data sets, etc.

According to one embodiment, an accurate representation of the target area (e.g., subsurface region) may be initially determined (e.g., prior to determining to drill the target area) by conducting a fully sampled 3D survey (i.e., a "base survey"). Then, different alternative models are derived, which represent potential changes that may occur in the accurately-represented target area over a lapse of time. The models may thus be representative of different predictions regarding how the target area may change over the lapse of time. As one example, the alternative models may reflect differences in permeability of at least a portion of the target area. Thus, the models may reflect how the initially-determined 3D representation of the target area (as determined in the base survey) may change over the time lapse based on whether a permeability barrier, low permeability, or high permeability is encountered in the target area, as an example.

Then, in performing a time-lapse monitor survey (at a different (e.g., later) point in time than the base survey), a sparsely sampled monitor data set is acquired. In certain embodiments, such sparsely sampled monitor data set that is acquired for the later time-lapsed monitor survey is so limited that it alone is insufficient to generate an accurate 3D representation of the target area. Rather, instead of trying to perform a full interpretation of the sparsely sampled monitor data set, in certain embodiments; such sparsely sampled monitor data set is used to determine which of the plurality of alternative models is representative of the target area as it exists at the time of acquisition of the sparsely sampled monitor data set.

Figure 1:
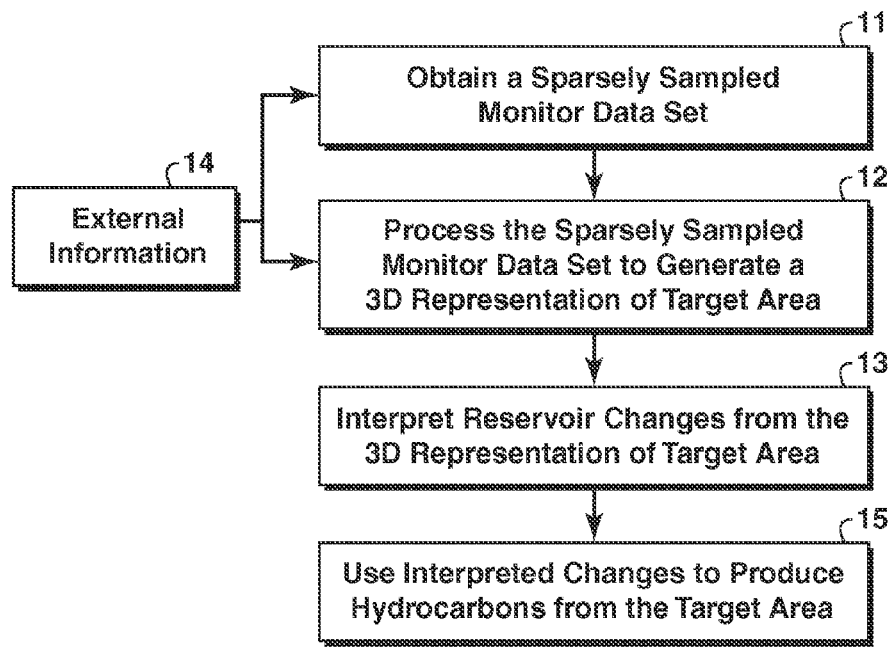
FIG. 1 shows a general flow diagram according to certain embodiments of the present invention.

FIG. 1 shows a general flow diagram according to certain embodiments of the present invention. In operational block 11, a sparsely sampled monitor data set is obtained for the target area being analyzed. This sparsely sampled monitor data set may be acquired by conducting a survey or may be data provided from survey that has been conducted or calculated. In block 12, the sparsely sampled monitor data set is processed to generate a 3D representation of the target area (e.g., the subsurface region or reservoir), and in block 13 the generated 3D representation is analyzed to interpret reservoir changes that have occurred since the previous survey (e.g., the base survey or a previous monitor survey). The processing of the 3D representation of the target area may include comparing (using pattern recognition) the recorded data to the data modeled for each of the alternative model (e.g., scenarios), then choosing the model that most closely matches the 3D representation of the target area (e.g., reservoir). Then, the interpreted changes may be used to produce hydrocarbons from the target area, as shown in block 15. This may involve determining how to change well operations (e.g., drilling producer or injection wells, secondary recovery techniques, or other known techniques) based on the interpreted changes.

It should be recognized that the operational flow of blocks 11-13 and 15 generally correspond to conventional techniques for performing a time-lapsed monitor survey, except conventionally a fully sampled monitor data set, such as for seismic data, is acquired instead of only a sparsely sampled monitor data set being obtained in block 11. The sparsely sampled monitor data set may be obtained, for example, by employing (in the seismic data acquisition of the monitor survey) less density of source and receiver locations than that commonly employed for an initial base survey. In certain embodiments, the sparsely sampled data set that is obtained in block 11 is so limited that it alone is insufficient to generate an accurate 3D representation of the target area.

However, accuracy of the 3D representation of the target area is achieved through use, in block 14, of certain external information in addition to the obtained sparsely sampled monitor data set for generation of the 3D representation. According to certain embodiments, such external information is utilized in designing the acquisition of the sparsely sampled monitor data set (of block 11) and/or in processing of the sparsely sampled monitor data set (in block 12), thereby enabling a sparsely sampled monitor data set to be acquired for the monitor survey while also enabling generation of an accurate 3D representation of the target area. As discussed further herein, external information, which may come from seismic or non-seismic sources, is used in certain embodiments to design a limited-effort acquisition program (for acquisition of the sparsely sampled monitor data set in block 11). Additionally or alternatively, in certain embodiments the external information is incorporated into the processing of the obtained sparsely sampled monitor data set (in block 12). The external information is selected to impose sufficient constraints on the target area (e.g., reservoir) to enable the sparsely sampled monitor data set to distinguish among the reservoir states that are possible when the sparsely sampled monitor data set is acquired. For instance, sufficient constraints may include information that is able to differentiate the different predicted models, information identified in the design phase, or information that is specific to the details of how to gather sufficient information in the monitor survey.

In one embodiment, the external information of block 14 may be a plurality of alternative predicted models of the target area. The models may be representative of different predictions regarding how the target area may change over a lapse of time. For instance, an accurate representation of the target area may be initially determined (e.g., prior to determining whether to drill the target area) by conducting a fully sampled 3D seismic survey (i.e., a "base survey"), and the alternative models may represent potential changes that are estimated to occur in the target area over a lapse of time. The alternative models may, for example, reflect differences in permeability of at least a portion of the target area. Thus, the models may reflect how the initially-determined 3D representation of the target area (as determined in the base survey) may change over the time lapse, for example, based on whether a permeability barrier, low permeability, or high permeability is encountered in the target area.

Further, the obtained sparsely sampled monitor data set of block 11 may then be processed to determine which of the plurality of alternative models is representative of the target area. It may be processed by pattern recognition techniques (e.g., differencing, minimum distance approaches, neural nets, or Bayesian methods). Examples of specific techniques may include the techniques disclosed in U.S. Pat. Nos. 4,969, 130 and 7,162,463, for example. Thus, instead of trying to perform a full interpretation of the sparsely sampled monitor data set, in certain embodiments; such sparsely sampled monitor data set is used to determine which of the plurality of alternative models is representative of the target area as it exists at the time of acquisition of the sparsely sampled monitor data set.

Figure 2:
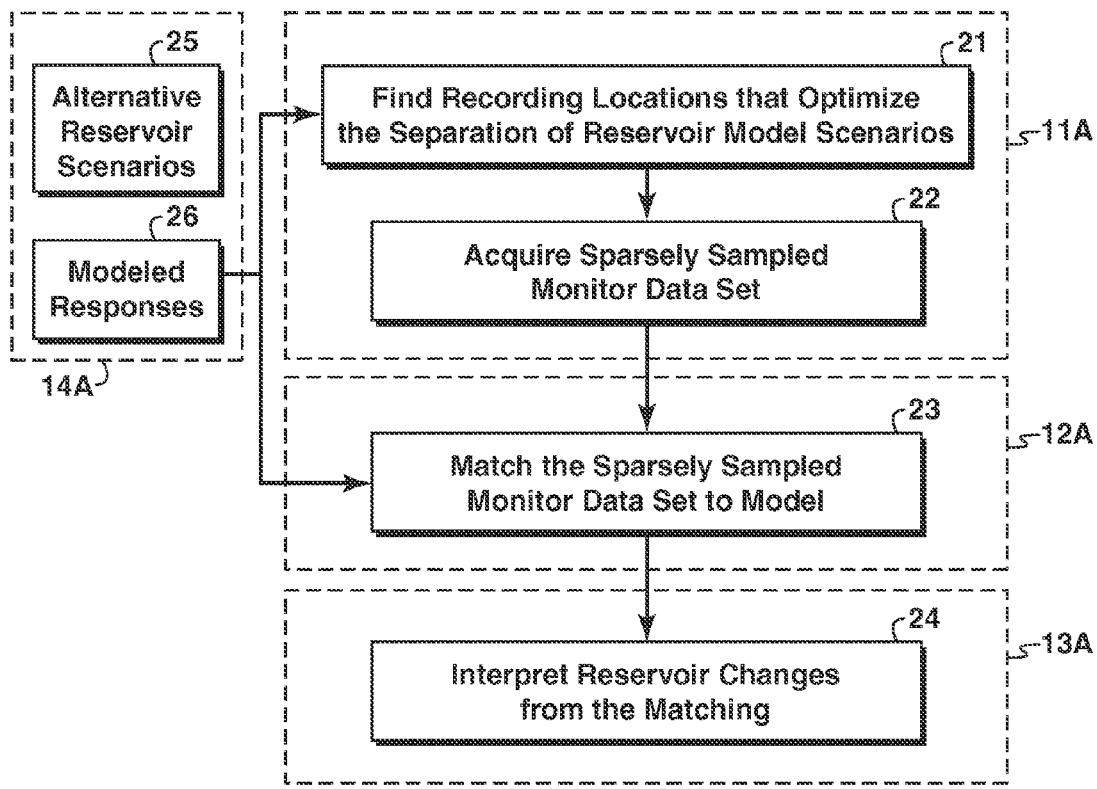
FIG. 2 shows an exemplary operational flow of one embodiment that employs a plurality of alternative predicted models according to one embodiment of the present invention.

Turning to FIG. 2, an exemplary operational flow of one embodiment that employs such a plurality of alternative predicted models (or "scenarios") is shown. Exemplary operational blocks 11A, 12A, 13A, and 14A are shown, which correspond generally to the general operational blocks 11-14, respectively, of FIG. 1 with the result of the process being used as described in block 15 (not shown). In this exemplary embodiment, the external information is a set of alternative reservoir models (e.g., scenarios). The models (e.g., scenarios) are consistent with the data from the base survey, but have different flow properties so they have different responses at the time of the monitor survey. The data modeled from the scenarios is used to design the limited/sparse acquisition program (employed in block 11A), and in the interpretation of the recorded sparsely sampled monitor data set. This approach may be applied to various data types, such as seismic, electromagnetic surveys, magnetic, gravity and the like. As a result of this technique, the surveys may be obtained that are less expensive and more efficient to process.

According to one embodiment, the exemplary implementation of FIG. 2 may be applied to reservoirs where it is possible to identify distinct reservoir models (e.g. "scenarios") that are indistinguishable based on currently available information (e.g., based on the base survey), but, as production of the reservoir proceeds, evolves such that they have different responses at some later time. For this implementation, the "external information" in block 14 of FIG. 1 is the set of time-lapse responses modeled for each of the reservoir scenarios or models. Thus, the external information 14A of FIG. 2 includes alternative models or reservoir model scenarios $m_i$, i=1, 2 . . . N, that are predicted (i.e., N number of alternative models "$m_i$" are predicted), as shown in block 25.

Because the reservoir model scenarios are indistinguishable using the base data set from the base survey, the model scenarios have identical base elastic properties described by a vector b that produces identical modeled responses $S(b)$ for the base survey. Because the different model scenarios have different flow properties, after a period of production the model scenarios have different distributions of pore fluids and pressures, resulting in a set of scenario-dependent elastic property vectors of the reservoir model scenarios $m_i$ that produce different modeled responses $S(m_i)$. Thus, modeled responses $S(b)$ for the base survey and the different modeled responses $S(m_i)$ are also included in the external information 14A in this exemplary embodiment, as shown in block 26 of FIG. 2.

In this exemplary embodiment, block 11A comprises blocks 21 and 22. In block 21, data acquisition or recording locations R that optimize separation of the reservoir model scenarios $m_i$ are determined, as discussed further below. In block 22, sparsely sampled monitor data set(s) are acquired at the locations R, resulting in the sparsely sampled monitor data set(s) $R(m)$, where m is the vector of elastic properties that characterizes the true earth model at the time of the monitor survey.

In operational block 23, the acquired sparsely sampled monitor data set(s) $R(m)$ are matched to reservoir model scenarios $m_i$. The difference between modeled base and monitor responses (i.e., difference modeled responses $S(m_i)$-$S(b)$) for each of the scenarios constitutes a set of pattern vectors that can be matched to recorded differences $R(m)$-$R(b)$ (wherein $R(b)$ is the recorded data for the base survey) using standard pattern recognition techniques, as noted above.

Subtracting the base traces in the data from the base survey from the monitor traces in the data from the monitor survey, as discussed above, may not be needed, but, in practice, it usually is beneficial because of uncertainty in the base elastic model vector b. Thus, in certain embodiments, the modeled differences (e.g., difference between the base model and the model scenarios) are compared to the recorded differences, while in other embodiments, the modeled traces may be compared directly to the recorded traces without ever computing differences. That is, in certain embodiments the modeled data sets of the plurality of alternative reservoir model scenarios $m_i$ may be compared directly to the acquired sparsely sampled monitor data set $R(m)$. In principle, if accurate earth models (e.g., base models) are available for reproducing the base traces, it may not matter whether the differences were computed, as the outcome is the same. In practice, where there is uncertainty about the base model, it is preferable to use computed differences in the manner discussed above.

In operational block 24, the reservoir changes are interpreted/analyzed using the model scenario that optimizes certain aspects of the match. For instance, the model scenario that matches the recorded data is selected, in operational block 24, as the reservoir state. In this manner, the reservoir changes, which resemble one of the model scenarios more closely than the other model scenarios, are reviewed and used to assess properties about the reservoir based at least partially on the model scenario that is selected.

In complex cases, the elastic properties expected for a model scenario may be uncertain and the ranges of properties for different model scenarios may overlap. In such cases, the elastic property vectors are multidimensional random variables with probability densities $P(b)$ and $P(m_i)$, and the data matching process is probabilistic.

Referring to FIG. 2, the external information 14A for this exemplary implementation is the set of modeled differences for each model scenario $S(m_i)$-$S(b)$. Because modeled data can be generated for any pair of sources and receivers, experimental design methods (see e.g., Curtis, A., 2004, *Theory of Model-Based Geophysical Survey and Experimental Design*, The Leading Edge, 23, 997) may, in certain embodiments, be used (in block 21 of FIG. 2) to find the locations R (e.g., placement of sources and receivers) that optimize separation of the model scenarios and addresses the desired economic and operational constraints. That is, certain economic and operational constraints may be predefined, and the placement of sources and receivers at certain locations R that optimize the separation of the model scenarios while satisfying the predefined operational and economic constraints are found. Absent such economic and operational constraints, one may determine the placement locations R as that commonly used for a fully sampled monitor survey, but the economic and operational constraints restrict the placement locations within a sparsely sampled seismic monitor data set. Thus, the external information 14A about the model scenarios is used in this exemplary embodiment to define how the sparsely sampled monitor data set $R(m)$ is acquired. Processing, in this exemplary embodiment, includes pattern-recognition-based matching of the recorded data to the model scenarios generated at the actual source-receiver locations. Imaging the recorded data may not be necessary in this exemplary implementation of the invention. Rather, the selected model scenario may serve as a representation (e.g., a 3D image) that accurately represents the state of the reservoir at the time of acquisition of the sparsely sampled monitor data set.

As may be appreciated, the above mentioned techniques may be utilized for various types of data sets. For instance, one could model the electromagnetic response of the possible reservoir scenarios, record CSEM (controlled source electromagnetic) data at the optimum locations indicated by the modeling, and match the observed electromagnetic response to those predicted for each scenario.

Examples of applying the above-described implementation of FIG. 2 to synthetic seismic data sets are now provided for illustrative purposes. For instance, a highly-simplified example is described that is intended to illustrate how a model scenario testing approach, such as that of FIG. 2, may be applied according to one embodiment of the present invention. For this example, consider the set of reservoir model scenarios shown in FIG. 3.

Figure 3:
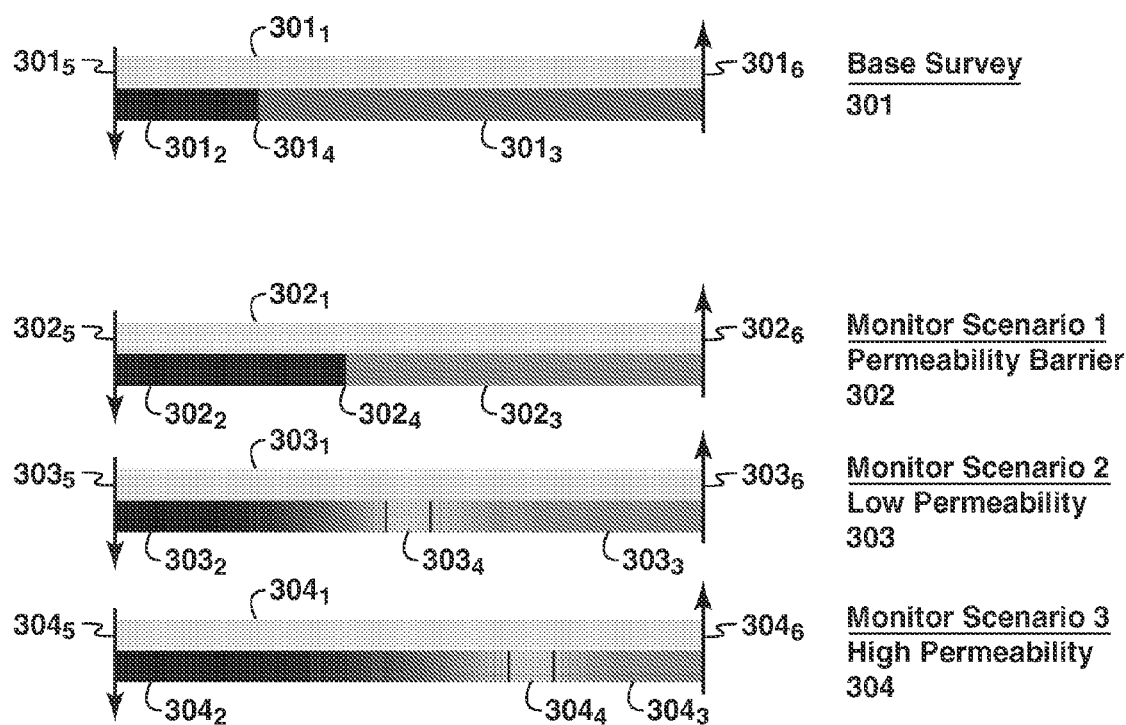
FIG. 3 shows an exemplary set of subsurface hydrocarbon reservoir models that may be employed according to one embodiment of the present invention.

FIG. 3 shows a first set of bars 301 labeled "Base Survey", and second to fourth sets of bars 302-304, labeled Monitor Scenario 1 to 3 (e.g., model scenarios), respectively. The bars 301-304 in each instance indicate the geometry of the top reservoir reflector. The top bar in each instance, $301_1$, $302_1$, $303_1$ and $304_1$, represents the shale that forms the seal for a subsurface region. The first portion of the bar beneath the top bar, labeled $301_2$, $302_2$, $303_2$ and $304_2$, respectively, represents portions of the reservoir where the pore fluid is water. The second portion of the bar beneath the top bar, labeled $301_3$, $302_3$, $303_3$ and $304_3$, respectively, represents portions of the reservoir where the pore fluid is oil. The interval between the first and second portion of the bottom bar, is an oil/water contact (OWC) (e.g., barrier area, a mixing area or interval) and labeled $301_4$, $302_4$, $303_4$ and $304_4$, respectively. The top set of bars (labeled "Base Survey") represents the state of this part of the reservoir at the time of the base survey, with the OWC $304_1$ located near the left end of the bar.

After acquisition of the base data set, operations include injecting water into the reservoir being modeled at injector $301_5$, $302_5$, $303_5$ and $304_5$, respectively, while oil or gas is produced from the producer $301_6$, $302_6$, $303_6$ and $304_6$, respectively. Three possible model scenarios have been identified/predicted by the time the monitor seismic data (e.g., sparsely sampled monitor data set) is later acquired, depending on the permeability of the reservoir sand, shown as Monitor Scenarios 1-3. The Monitor Scenarios 1-3 are exemplary embodiments of alternative models or reservoir model scenarios. In particular, Monitor Scenario 1 assumes that there is a permeability barrier between the injector $302_5$ and the producer $302_6$, so the injected water progresses a short distance toward the producer $302_6$ and stops when it encounters the barrier (i.e., at barrier area $302_4$). Monitor Scenario 2 assumes that the reservoir has low permeability, and the injected water is still far from the producer $303_6$, leaving most of the oil still to be produced. And, Monitor Scenario 3 assumes a high permeability channel between the injector $304_5$ and producer $304_6$, with the injected water almost reaching the producer $304_6$ and little oil remaining to be produced. The three model scenarios each have the same seismic response at the time of the base survey, but the different fluid movements result in different monitor responses or modeled responses. The monitor survey should produce seismic data that matches that modeled from one of the three possible Monitor Scenarios 1 to 3 in this example. That is, a sparsely sampled seismic monitor data set acquired for a monitor survey can be used for determining which of the three Monitor Scenarios 1 to 3 accurately represents the reservoir as of the time of acquisition of the sparsely sampled seismic monitor data set.

Figure 4:
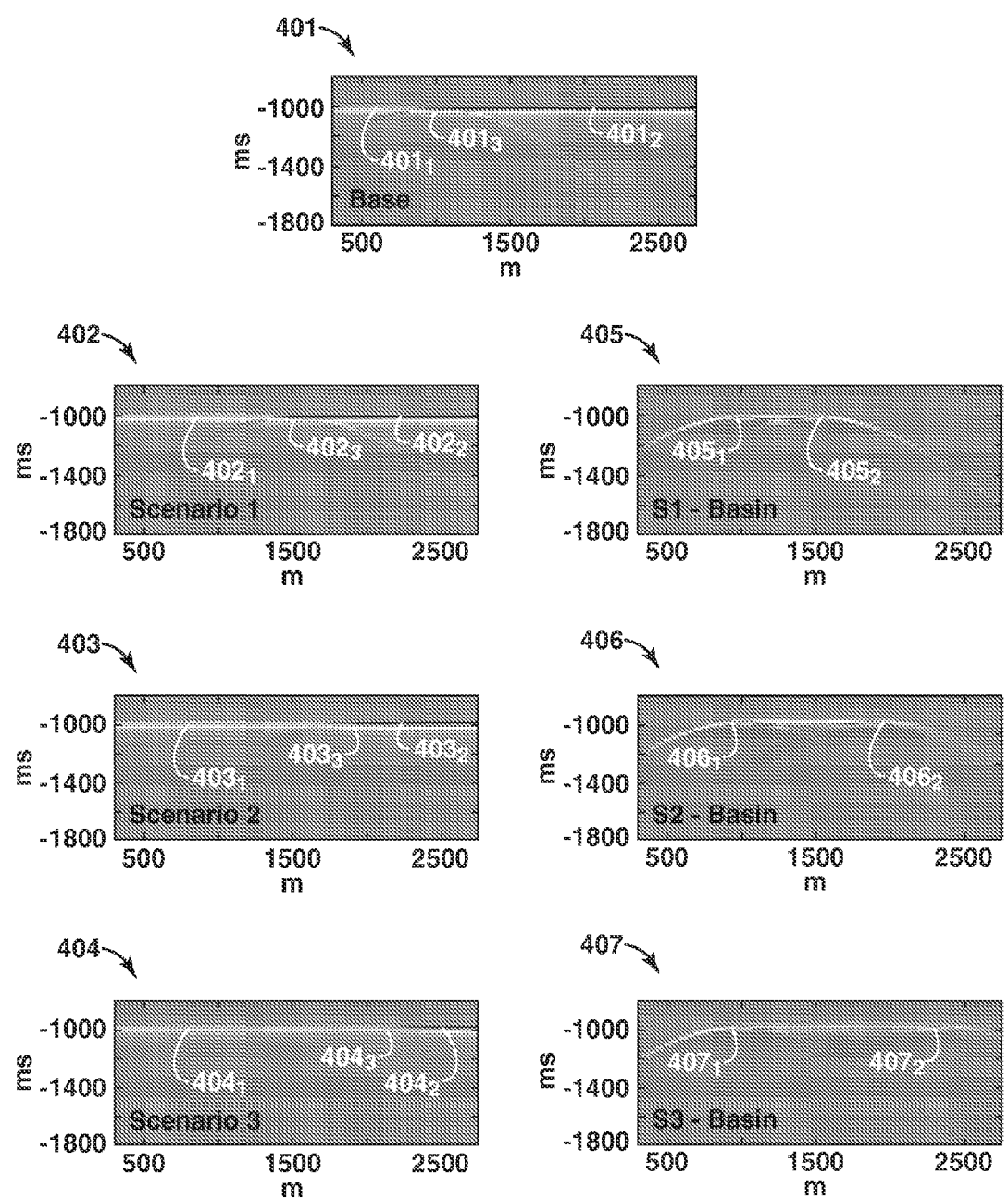
FIG. 4 shows exemplary seismic data modeled for a base survey and for each of the three models of FIG. 3.

FIG. 4 shows a seismic data section 401 modeled for the base survey of FIG. 3, and seismic data sections 402-404 for each of the three Monitor Scenarios 1 to 3 of FIG. 3, respectively. The seismic data sections depict a line of zero-offset traces as they are recorded in the field for a target area with no imaging performed. The single reflector in each section is the top reservoir reflector (i.e. the bars in FIG. 3). The three sections 405-407 of FIG. 4 show the differences between the modeled monitor sections 402-404 for each respective Monitor Scenario 1-3 and the base section 401. Differences are represented on each section between points $405_1$, $406_1$ and $407_1$, which relate to the base survey initial OWC $401_3$, and the points $405_2$, $406_2$ and $407_2$, which relate to the OWC $402_3$, $403_3$ and $404_3$, respectively. For this example, response sections $401_1$, $402_1$, $403_1$ and $404_1$ represent weak signals in the seismic data sections 401-404 (which relate to the first portions $301_2$, $302_2$, $303_2$ and $304_2$ of FIG. 3, respectively). Similarly, response sections $401_2$, $402_2$, $403_2$ and $404_2$ represent strong signals in the seismic data representations 401-404 (which relate to the second portions $301_3$, $302_3$, $303_3$ and $304_3$ of FIG. 3, respectively). Finally, response points $401_3$, $402_3$, $403_3$ and $404_3$ represent the OWC in the seismic data sections 401-404 (which relate to the permeability barrier areas $301_4$, $302_4$, $303_4$ and $304_4$ of FIG. 3, respectively). In particular, the example representation of the seismic data section 401 shows that the oil-water contact (OWC) barrier area $302_4$ of FIG. 3 at the time of the base survey is located at 1000 m. The seismic data sections 402-404 relate to the zero-offset traces modeled for each of the three Monitor Scenarios 1 to 3. And, the seismic data sections 405-407 show difference traces modeled for each of the three Monitor Scenarios 1 to 3. These seismic data sections 402-407 may be used to define and interpret a limited data set (i.e. the sparsely sampled data set) that may be used to distinguish the correct scenario. The oil producer is at 2700 m, while the permeability barrier for Monitor Scenario 1 is located at 1500 m, the injected water flow front for Monitor Scenario 2 in this example is located at 1950 m, and the injected water flow front for Monitor Scenario 3 in this example is located at 2400 m.

For this example, if a full 2D data had been recorded, one may just perform 2D imaging and get an accurate representation of the seismic response of the reservoir. However, it is possible to distinguish among the three predicted Monitor Scenarios 1 to 3 with a limited data set (e.g. sparsely sampled seismic monitor data set).

Figure 5:
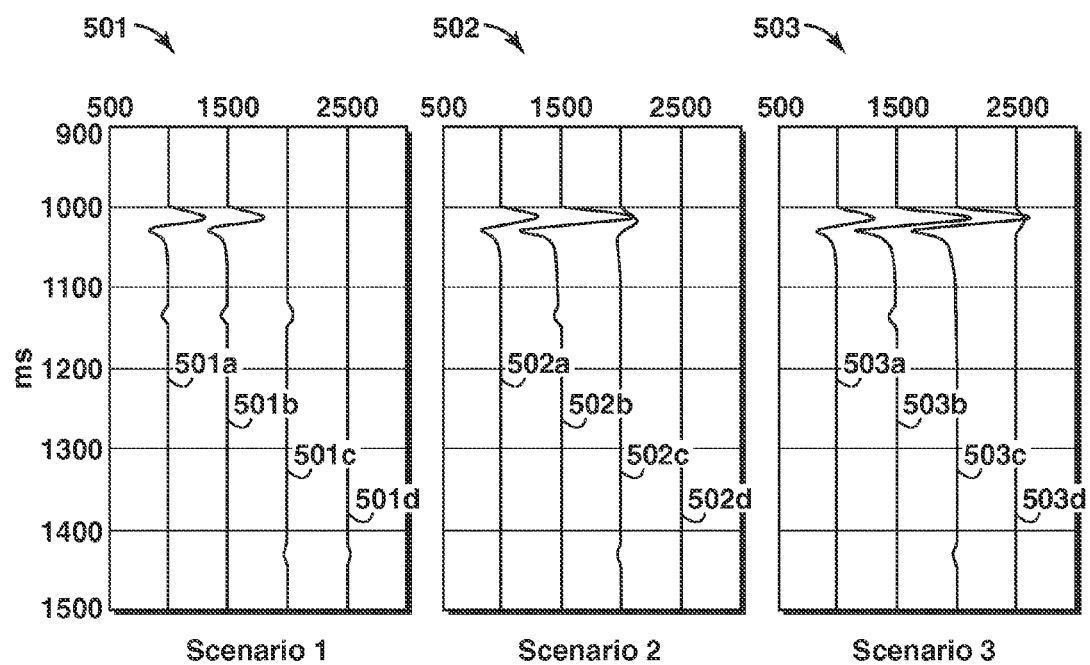
FIG. 5 shows modeled zero-offset difference traces extracted at four uniformly spaced locations along the line in FIG. 4 for each of the three models according to one embodiment of the present invention.

FIG. 5 shows modeled zero-offset difference traces 501a-501d extracted at four uniformly spaced locations along the seismic data sections 405-407 in FIG. 4 for each of the three Monitor Scenarios 501-503. The horizontal scale in 501-503 indicates the coordinates of each trace, in meters (m), along the seismic sections 405-407 relative to lines 501a-d, 502a-d, and 503a-d, and the amplitudes of the traces indicate the strength of the seismic response (units depend on the sensor type), as a function of time in milliseconds (ms) shown on the vertical scale. In this example, these traces, denoted by suffixes "a"-"d," have been extracted at 500 meters (m) intervals from the modeled difference sections of the seismic data sections 405-407 of FIG. 4. Each of the four traces of the Monitor Scenarios 1 to 3 has a clearly different change in seismic response, which implies that the real seismic data recorded at these locations can be used to identify one of the Monitor Scenarios 1 to 3 that is closest to the actual reservoir's response.

The three Monitor Scenarios 1 to 3 clearly exhibit different responses, although one cannot perform imaging with the respective traces 501a-d, 502a-d and 503a-d alone, and it is difficult to interpret the traces without prior knowledge of the three Monitor Scenarios. The most accurate Monitor Scenario 1 to 3 may be identified by comparing the recorded difference traces R(m)-R(b) to the difference traces modeled (S($m_t$)-S(b)) for each of the three scenarios. However, the four locations (i.e., 1000 m, 1500 m, 2000 m and 2500 m) for the traces were arbitrarily selected in the example of FIG. 5, and are not likely to be the optimal selections for separating the model scenarios. That is, there may be other recording locations that better separate/distinguish the model scenarios, as discussed further below.

Figure 6:
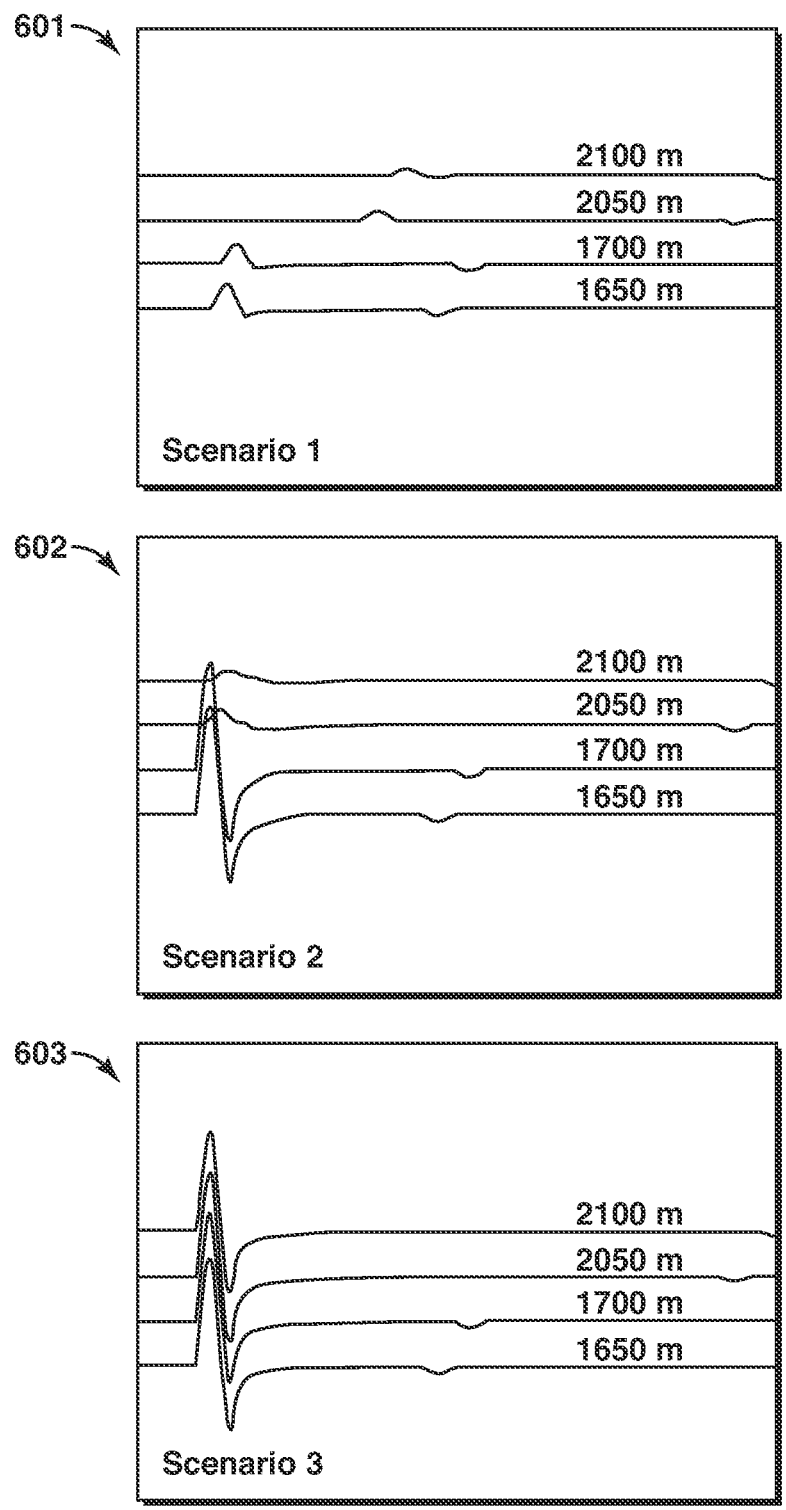
FIG. 6 shows difference traces modeled at the four locations that separate the three models according to one embodiment of the present invention.

FIG. 6 shows sets of difference traces 601-603 modeled at the four locations (e.g., receiver locations 1650 m, 1700 m, 2050 m and 2100 m) that optimize the separations of the three Monitor Scenarios 1 to 3, respectively. The trace sets 601-603 are the difference traces between the base seismic data section 401 and the respective seismic data sections 402-404. In the trace sets 601-603, the receiver locations may be chosen by various techniques to maximize the separation between scenarios. These techniques are discussed further below.

In this example, the receiver locations may be adjusted to optimize the determination of the one of the Monitor Scenario 1 to 3 that closely resembles the time-lapsed change in the reservoir. As a specific example, for the Monitor Scenario 1, two receivers may be located just to the right of the permeability barrier $302_4$ hypothesized in Monitor Scenario 1, and two receivers may be located just to the left of the producing well $302_6$. As such, for Monitor Scenario 1, the four receiver locations (i.e., traces labeled 1650 m, 1700 m, 2050 m and 2100 m) exhibit small differences between base and monitor seismic responses. This small difference is indicated by the small amplitude changes in the traces at 1650 m, 1700 m, 2050 m and 2100 m of the trace set 601. For Monitor Scenario 2, the results have large amplitude differences at the receiver locations near the producer (i.e., traces at 1650 m and 1700 m), while the other receiver locations (i.e., traces at 2050 m and 2100 m) provide results having small amplitude differences. Finally, for Monitor Scenario 3, the results have large amplitude differences at all four receiver locations (i.e., traces at 1650 m, 1700 m, 2050 m and 2100 m). Accordingly, with these modeled responses, the data obtained from seismic sparsely sampled monitor data may be compared with the traces 601-603 to determine which of the Monitor Scenarios 1 to 3 most closely resembles the actual response. That is, the seismic sparsely sampled monitor data may be compared with the Monitor Scenarios 1 to 3 without having to process the data to generate a 3D image.

Further, the differences in time-lapse response at the optimum receiver locations in FIG. 6 are significantly larger than the differences between the sub-optimum locations in indicated in FIG. 5. As such, the deployment configuration of receivers in FIG. 6 is an enhancement to the typical receiver spacing and should enhance performance of the survey in the presence of noise and scenario uncertainty. That is, the greater the separation between model scenarios, the less likely that the separation may be obscured by noise.

Note that the traces 601-603 are not uniformly spaced in this example. That is, all four traces (i.e., receiver locations 1650 m, 1700 m, 2050 m and 2100 m) in the trace sets 601-603 are located in the second portions $301_3$, $302_3$, $303_3$ and $304_3$ of FIG. 3, which corresponds to the portion of the reservoir where the original pore fluid is oil. The original oil-water contact (OWC in $401_4$) is located at 1000 m (labeled on the bottom axes of seismic data section 401). The permeability barrier is at 1500 m for Monitor Scenario 1, while the flow fronts for the low and high permeability model scenarios are diffuse, but are approximately at 1950 m and 2400 m for the Monitor Scenarios 2 and 3, respectively. This configuration, which is based on the model scenarios, such as Monitor Scenarios 1 to 3, may be utilized to further reduce the receiver locations needed for the sparse data set. It should be appreciated that based on the present techniques, the receiver location separations may be optimized by maximizing the total root mean square (RMS) difference among the Monitor Scenarios 1 to 3. For this simple example, the optimum locations of the receivers may be determined by an exhaustive search, with the minimum trace separation set at 25 m. For more complex cases, sophisticated optimization algorithms, such as the simultaneous perturbation stochastic approximation (SPSA) algorithm, are available to determine the recording locations.

Embodiments, or portions thereof, may be embodied in program or code segments operable upon a processor-based system (e.g., computer system) for performing functions and operations as described herein. The program or code segments making up the various embodiments may be stored in a computer-readable medium, which may comprise any suitable medium for temporarily or permanently storing such code. Examples of the computer-readable medium include such physical computer-readable media as an electronic memory circuit, a semiconductor memory device, random access memory (RAM), read only memory (ROM), erasable ROM (EROM), flash memory, a magnetic storage device (e.g., floppy diskette), optical storage device (e.g., compact disk (CD), digital versatile disk (DVD), etc.), a hard disk, and the like.

Figure 7:
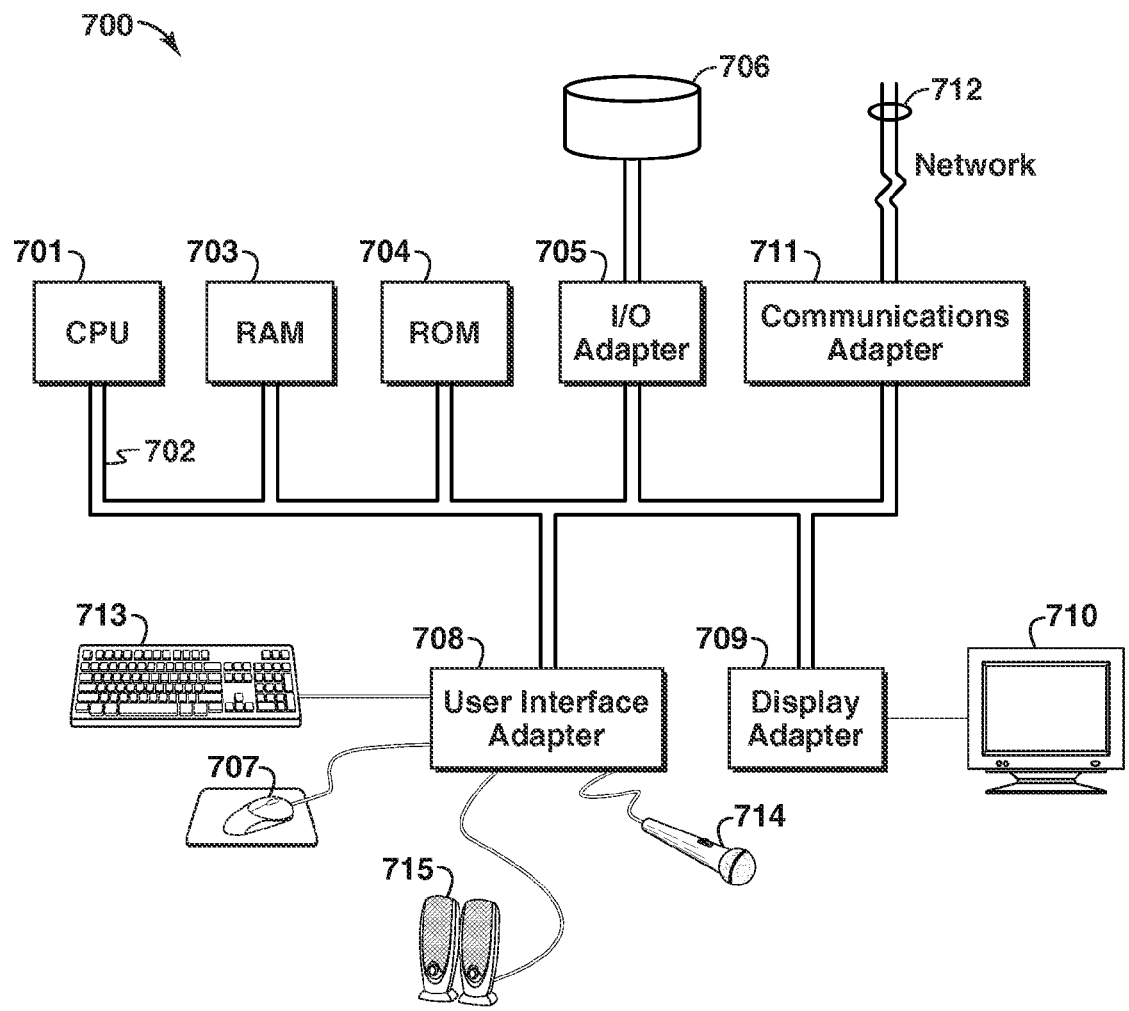
FIG. 7 shows an exemplary computer system which may implement all or portions of certain embodiments of the present invention.

FIG. 7 illustrates an exemplary computer system 700 on which software for performing processing operations of embodiments of the present invention may be implemented. Central processing unit (CPU) 701 is coupled to system bus 702. CPU 701 may be any general-purpose CPU. The present invention is not restricted by the architecture of CPU 701 (or other components of exemplary system 700) as long as CPU 701 (and other components of system 700) supports the inventive operations as described herein. CPU 701 may execute the various logical instructions according to embodiments. For example, CPU 701 may execute machine-level instructions for performing processing according to the exemplary operational flow described above in conjunction with FIGS. 1-2. For instance, CPU 701 may execute machine-level instructions for performing operational block 12A of FIG. 2, as an example.

Computer system 700 also preferably includes random access memory (RAM) 703, which may be SRAM, DRAM, SDRAM, or the like. Computer system 700 preferably includes read-only memory (ROM) 704 which may be PROM, EPROM, EEPROM, or the like. RAM 703 and ROM 704 hold user and system data and programs, as is well known in the art.

Computer system 700 also preferably includes input/output (I/O) adapter 705, communications adapter 711, user interface adapter 708, and display adapter 709. I/O adapter 705, user interface adapter 708, and/or communications adapter 711 may, in certain embodiments, enable a user to interact with computer system 700 in order to input information.

I/O adapter 705 preferably connects to storage device(s) 706, such as one or more of hard drive, compact disc (CD) drive, floppy disk drive, tape drive, etc. to computer system 700. The storage devices may be utilized when RAM 703 is insufficient for the memory requirements associated with storing data for operations of embodiments of the present invention. The data storage of computer system 700 may be used for storing such information as the alternate reservoir model scenarios $m_i$ (e.g., as in block 25 of FIG. 2), modeled data of the modeled responses S(b) and S($m_i$) (e.g., as in block 26 of FIG. 2), the determined locations R (e.g., as in block 21 of FIG. 2), an acquired sparsely sampled seismic monitor data set R(m) (e.g., as in block 22 of FIG. 2), and/or other data used or generated in accordance with embodiments of the present invention. Communications adapter 711 is preferably adapted to couple computer system 700 to network 712, which may enable information to be input to and/or output from system 700 via such network 712 (e.g., the Internet or other wide-area network, a local-area network, a public or private switched telephony network, a wireless network, any combination of the foregoing). User interface adapter 708 couples user input devices, such as keyboard 713, pointing device 707, and microphone 714 and/or output devices, such as speaker(s) 715 to computer system 700. Display adapter 709 is driven by CPU 701 to control the display on display device 710 to, for example, display information pertaining to a target area under analysis, such as displaying a generated 3D representation of the target area, according to certain embodiments.

It shall be appreciated that the present invention is not limited to the architecture of system 700. For example, any suitable processor-based device may be utilized for implementing all or a portion of embodiments of the present invention, including without limitation personal computers, laptop computers, computer workstations, and multi-processor servers. Moreover, embodiments may be implemented on application specific integrated circuits (ASICs) or very large scale integrated (VLSI) circuits. In fact, persons of ordinary skill in the art may utilize any number of suitable structures capable of executing logical operations according to the embodiments.

The method for performing time-lapse monitor surveying is described herein with respect to seismic surveys. However, persons skilled in the art having the benefit of this disclosure will recognize that the present invention may also be used for performing time-lapse monitor surveys of electromagnetic surveys or magnetotelluric surveys. The term "electromagnetic survey" as used herein refers to a controlled source electromagnetic (CSEM) survey which obtains data by imparting an electromagnetic field above or near the top of an area of the Earth's subsurface to be surveyed (on land or in the water as explained above), and measuring the Earth's response near the top of the area or above the Earth's surface. Such data may be frequency domain CSEM data, transient (time domain) CSEM data, whether data acquired by imparting either or both electric and magnetic fields to the Earth's subsurface, and so imparted along any electric or magnetic dipole orientation. The CSEM data may also be acquired by measuring the Earth's response to such fields by measuring imparted voltage across an electrode pair, voltage induced in a closed loop antenna, or magnetic field amplitude, again along any selected dipole moment orientation. The term "magnetotelluric" (MT) survey as used herein is an established technique that uses measurements of naturally occurring electromagnetic fields to determine the electrical resistivity, or conductivity, of subsurface rocks. An MT survey employs time series measurements of orthogonal components of the electric and magnetic fields, which define a surface impedance. This impedance, observed over a broad band of frequencies and over the surface, determines the electrical conductivity distribution beneath that surface, with horizontal layers of the earth being mathematically analogous to segments of a transmission line. Principal factors affecting the resistivity of subsurface materials include temperature, pressure, saturation with fluids, structure, texture, composition and electrochemical parameters. Resistivity information may be used to map major stratigraphic units, determine relative porosity or support a geological interpretation. A significant application of MT surveying is oil exploration. An MT or electromagnetic survey may be performed in addition to seismic data surveys. A combination of data from two or more different survey methods may lead to a more complete understanding of subsurface structure than may be possible through the use of any single technique alone.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method comprising:
obtaining a sparsely sampled monitor data set for a subsurface region; and
processing, using a computer, the obtained sparsely sampled monitor data set with external information to generate a more accurate 3D representation of the subsurface target area than could be obtained from the sparsely sampled monitor data set alone, wherein the external information comprises a plurality of alternative models of the subsurface region that each represent the subsurface region as the subsurface region is predicted to exist at an additional point in time when the sparsely sampled monitor data set is acquired, said alternative models being generated from an earlier, more fully sampled base survey using varying assumptions of how the subsurface region will change over time.

2. The method of claim 1 wherein the processing comprises processing the obtained sparsely sampled monitor data set to determine which of the plurality of alternative models is representative of the subsurface region as the subsurface region exists at the time the sparsely sampled monitor data set was acquired.

3. The method of claim 2, wherein the determining comprises comparing one or more of the plurality of alternative models to the sparsely sampled monitor data set to determine which of the plurality of alternative models is representative of the subsurface region as the subsurface region exists at the time the sparsely sampled monitor data set was acquired.

4. The method of claim 2, wherein the determining which of the plurality of alternative models is representative of the subsurface region as the subsurface region exists at the time the sparsely sampled monitor data set was acquired is determined without generating a 3D image of the subsurface region at the time the sparsely sampled monitor data set was acquired.

5. The method of claim 2, wherein the determining further comprises:
imaging the sparsely sampled monitor data set to generate a 3D image of the subsurface region as the subsurface region exists at the time the sparsely sampled monitor data set was acquired; and
comparing the 3D image of the subsurface region to a modeled 3D image of the plurality of alternative models of the subsurface region as the subsurface region exists at the time the sparsely sampled monitor data set was acquired to determine which of the plurality of alternative models is representative of the subsurface region as the subsurface region exists at the time the sparsely sampled monitor data set was acquired.

6. The method of claim 1 further comprising determining a set of data acquisition locations within or on the subsurface region that distinguishes the plurality of alternative models within one of a predefined economic constraint, a predefined operational constraint and any combination thereof.

7. The method of claim 6 further comprising obtaining seismic data at the determined data acquisition locations, resulting in the sparsely sampled monitor data set.

8. The method of claim 1 wherein the sparsely sampled monitor data set comprises seismic data for the subsurface target area.

9. The method of claim 1 wherein the sparsely sampled monitor data set comprises electromagnetic data for the subsurface target area.

10. A method comprising:
   determining a plurality of alternative models of a subsurface region;
   obtaining a sparsely sampled monitor data set for the subsurface region; and
   processing, using a computer, the obtained sparsely sampled monitor data set to determine which of the plurality of alternative models is representative of the subsurface region as the subsurface region exists at the time the sparsely sampled monitor data set was acquired.

11. The method of claim 10 wherein the obtained sparsely sampled monitor data set is insufficient alone to process to generate an accurate three-dimensional (3D) representation of the subsurface region.

12. The method of claim 10, wherein the determining comprises comparing each of the plurality of alternative models to the sparsely sampled monitor data set to determine which of the plurality of alternative models is representative of the subsurface region as the subsurface region exists at the time the sparsely sampled monitor data set was acquired.

13. The method of claim 10, wherein the determining which of the plurality of alternative models is representative of the subsurface region as the subsurface region exists at the time the sparsely sampled monitor data set was acquired is determined without generating a 3D image of the subsurface region at the time the sparsely sampled monitor data set was acquired.

14. The method of claim 10, wherein the determining further comprises:
   imaging the sparsely sampled monitor data set to generate a 3D image of the subsurface target area as the subsurface target area exists at the time the sparsely sampled monitor data set was acquired; and
   comparing the 3D image of the subsurface target area to a modeled 3D image of the plurality of alternative models of the subsurface target area as the subsurface target area exists at the time the sparsely sampled monitor data set was acquired to determine which of the plurality of alternative models is representative of the subsurface target area as the subsurface target area exists at the time the sparsely sampled monitor data set was acquired.

15. The method of claim 10 wherein the sparsely sampled monitor data set comprises seismic data for the subsurface region.

* * * * *